(12) United States Patent
Shinohara et al.

(10) Patent No.: US 9,678,264 B2
(45) Date of Patent: Jun. 13, 2017

(54) LIGHT GUIDE PLATE AND SURFACE LIGHT SOURCE DEVICE

(71) Applicant: OMRON Corporation, Kyoto-shi, Kyoto (JP)

(72) Inventors: Masayuki Shinohara, Kyoto (JP); Norikazu Kitamura, Osaka (JP); Kazuhide Hirota, Saitama (JP)

(73) Assignee: OMRON Corporation, Kyoto (JP)

( * ) Notice: Subject to any disclaimer, the term of this patent is extended or adjusted under 35 U.S.C. 154(b) by 134 days.

(21) Appl. No.: 14/681,746

(22) Filed: Apr. 8, 2015

(65) Prior Publication Data
US 2015/0293289 A1 Oct. 15, 2015

(30) Foreign Application Priority Data
Apr. 9, 2014 (JP) .................................. 2014-080217

(51) Int. Cl.
*F21V 8/00* (2006.01)

(52) U.S. Cl.
CPC ........... *G02B 6/002* (2013.01); *G02B 6/0038* (2013.01)

(58) Field of Classification Search
CPC .............................. G02B 6/002; G02B 6/0038
See application file for complete search history.

(56) References Cited

U.S. PATENT DOCUMENTS

| | | | | |
|---|---|---|---|---|
| 2007/0274100 A1* | 11/2007 | Yang | .................... | G02B 6/0018 362/615 |
| 2010/0195019 A1 | 8/2010 | Shinohara et al. | | |
| 2011/0205759 A1* | 8/2011 | Kurata | .................... | G02B 6/002 362/611 |
| 2011/0216267 A1* | 9/2011 | Miyamoto | ................ | F21V 7/22 349/62 |
| 2011/0286237 A1 | 11/2011 | Tanoue et al. | | |
| 2013/0044514 A1* | 2/2013 | Chang | .................. | G02B 6/0028 362/609 |
| 2013/0242231 A1* | 9/2013 | Kurata | ................. | G02B 6/0016 349/65 |
| 2014/0176873 A1* | 6/2014 | Shinohara | ............ | G02B 6/0016 349/65 |

FOREIGN PATENT DOCUMENTS

| | | |
|---|---|---|
| JP | 2013-196799 A | 9/2013 |
| WO | 2008/153024 A1 | 12/2008 |
| WO | 2010/070821 A1 | 6/2010 |

* cited by examiner

*Primary Examiner* — Dennis Y Kim
(74) *Attorney, Agent, or Firm* — Osha Liang LLP

(57) ABSTRACT

A light guide plate has a light guide plate member having a light incident surface on an end face of the light guide member, and a light emitting surface on a front surface of the light guide plate member, wherein the light incident surface is structured to have light incident thereon, and wherein the light emitting surface is structured to widen and emit light incident thereon out of the light guide plate member, and a directivity changing unit arranged on a light incident end portion of the light guide plate member on the front surface or a back surface of the light guide plate member. The directivity changing unit has a first inner inclined surface and a second inner inclined surface that change a directivity of the incident light within the directivity changing unit to widen the light laterally with respect to a direction perpendicular to the light incident surface.

12 Claims, 18 Drawing Sheets

LIGHT GUIDE PLATE AND SURFACE LIGHT SOURCE DEVICE

BACKGROUND

Field

The present invention relates to a light guide plate and a surface light source device, and more particularly, to a surface light source device used as a backlight of a liquid crystal display, and a light guide plate included in the surface light source device.

Related Art

The recent trend toward thinner mobile devices requires thinner surface light source devices incorporated in the mobile devices. Such a thinner surface light source device needs a thinner light guide plate. Although a light guide plate, which is a flat plate, can reduce its thickness, a light source such as an LED has a limitation in reducing its height. The thickness of the flat, thin light guide plate at its end face (light incident surface) can be greater than the height of the light source arranged to face the light incident surface of the light guide plate. In this case, the light source protrudes above the top surface of the light guide plate. Light emitted from the light source protruding above the light guide plate cannot entirely enter the light incident surface of the light guide plate and can partially leak out. This lowers the light use efficiency.

To overcome this disadvantage, a light guide plate including a flat light guide plate member may additionally include a light directing part thicker than the light guide plate member arranged at an end of the light guide plate member. The light directing part has an inclined surface that is inclined from its thickest position toward the end of the light guide plate member. Surface light source devices including such light guide plates are described in Patent Literature 1 and Patent Literature 2.

FIG. 1 shows an example of a surface light source device 11 incorporating a light guide plate including a light directing part thicker than a light guide plate member. The light guide plate 13 includes a light guide plate member 14 with a substantially uniform thickness, and a wedge-shaped light directing part 15. The light guide plate member 14 has a deflection pattern or a diffusion pattern on its back surface, and has a lenticular lens 16 arranged on its front surface. The light directing part 15 has an inclined surface 17, which is inclined from the thickest position of the light directing part 15 toward an end of the light guide plate member 14. The thickness of the light directing part 15 at its end face (light incident surface) is greater than the height of a light source 12. The surface light source device 11 including the light guide plate 13, in which the thickness of the light directing part 15 at its end face is greater than the height of the light source 12, allows light emitted from the light source 12 to efficiently enter the light directing part 15. The light entering the light directing part 15 is directed toward the light guide plate member 14 while it is widened into planar light. The light is reflected on the deflection pattern or the diffusion pattern and is emitted out of the light guide plate member 14 through its light emitting surface. The light emitted through the light emitting surface undergoes widening of the directivity with the lenticular lens 16. The surface light source device with this structure can be thin and can improve the light use efficiency of the light source.

In the surface light source device 11 including the light directing part 15 with the inclined surface 17, the light traveling obliquely with respect to the optical axis of the light source 12 in the light directing part 15 as viewed in the direction perpendicular to the light guide plate member 14 is reflected on the inclined surface 17 and widens in the lateral direction (in the width direction of the light guide plate). The resultant light forms a greater angle with the optical axis of the light source 12 as indicated by the arrows in FIG. 1. The light widened laterally on the inclined surface 17 can partially leak from the sides of the light guide plate 13, or can enter the lenticular lens 16 in the lateral direction and leak out of the lenticular lens 16. Such light loss would lower the light use efficiency and lower the uniformity of brightness.

A surface light source device described in Patent Literature 3 includes a directivity changing pattern arranged at one end of a light guide plate member near a light directing part. FIG. 2 is a plan view of a surface light source device 21 described in Patent Literature 3. The surface light source device 21 includes a light guide plate member 14, on which a lenticular lens 16 extends to a position inward from the end of the light guide plate member 14 to leave an area without the lenticular lens 16 between an inclined surface 17 of the light directing part 15 and the light guide plate member 14. In that area without the lenticular lens 16, a directivity changing pattern 22 is formed.

The directivity changing pattern 22 includes radially extending grooves. Each groove includes a downward inclined surface and an upward inclined surface. The downward inclined surface is inclined downward from the midpoint of the light guide plate toward the side. The upward inclined surface is inclined upward from the midpoint of the light guide plate toward the side. The downward inclined surface, which is inclined downward from the midpoint toward the side, has a greater width or a greater area than the upward inclined surface, which is inclined upward from the midpoint toward the side. As shown in FIG. 2, light entering the directivity changing pattern 22 and reflected by the directivity changing pattern 22 changes its directivity into a direction nearer the direction perpendicular to the light incident surface than the light that has yet to enter the directivity changing pattern 22. This structure reduces the amount of light leaking out of the surface light source device 21 from the sides of the light guide plate 13 or from the lenticular lens 16.

However, the surface light source device 21 described in Patent Literature 3 includes the light directing part 15 with a length K of, for example, 1.5 mm, and the directivity changing pattern 22 formed in the area with a length G of 1.5 mm. The surface light source device 21 thus has unused space, or space that is not used for emitting the illumination light, with at least a length of K+G=3.0 mm, which is the total length of the light directing part 15 and the area of the directivity changing pattern 22. This disables effective use of the area of the light guide plate 13.

Patent Literature 1: WO2010/070821

Patent Literature 2: Re-publication of PCT International Publication No. 2008-153024

Patent Literature 3: Japanese Unexamined Patent Application Publication No. 2013-196799

SUMMARY

One or more embodiments of the present invention provides a light guide plate and a surface light source device that improve the light use efficiency of the surface light source device and reduce unused space of the light guide plate.

A light guide plate according to one or more embodiments of the present invention includes a light guide plate member including a light incident surface on an end face thereof for allowing light to be incident and a light emitting surface on a front surface thereof for allowing light incident and widened to be emitted out of the light guide plate member, and a directivity changing unit arranged on a light incident end portion of the light guide plate member on the front surface or a back surface of the light guide plate member. The directivity changing unit includes a first inner inclined surface and a second inner inclined surface configured to change a directivity of the incident light within the directivity changing unit to widen the light laterally with respect to a direction perpendicular to the light incident surface, and a first outer inclined surface and a second outer inclined surface configured to change the directivity of the light widened laterally by the inner inclined surfaces to a directivity of light forming a smaller angle with the light incident surface.

In the light guide plate according to one or more embodiments of the present invention, the directivity changing unit is a protruding part of the front surface or the back surface of the light guide plate member, and a distance between a first meeting line between the first inner inclined surface and the first outer inclined surface and a second meeting line between the second inner inclined surface and the second outer inclined surface becomes greater at positions more away from the light emitting surface as viewed in a direction perpendicular to the front surface or the back surface of the light guide plate member.

In the light guide plate according to one or more embodiments of the present invention, the first inner inclined surface and the second inner inclined surface are inclined to be nearer the front surface or the back surface of the light guide plate member at positions nearer a midpoint between the first inner inclined surface and the second inner inclined surface in a plane including the light incident surface.

In the light guide plate according to one or more embodiments of the present invention, the first outer inclined surface and the second outer inclined surface are inclined to be nearer the front surface or the back surface of the light guide plate member at positions more away from a midpoint between the first inner inclined surface and the second inner inclined surface in a plane including the light incident surface.

In the light guide plate according to one or more embodiments of the present invention, the first and second inner inclined surfaces and the first and second outer inclined surfaces are flat surfaces or curved surfaces.

In the light guide plate according to one or more embodiments of the present invention, a meeting line between the first inner inclined surface and the second inner inclined surface is inclined to be more away from the front surface or the back surface of the light guide plate member at positions nearer the light incident surface.

In the light guide plate according to one or more embodiments of the present invention, the light emitting surface comprises a lenticular lens pattern.

In the light guide plate according to one or more embodiments of the present invention, the light incident end portion of the light guide plate member has both sides inclined with respect to the direction perpendicular to the light incident surface as viewed in the direction perpendicular to the front surface or the back surface of the light guide plate member, and the width of the light incident end portion of the light guide plate member is greater at positions more away from the light incident surface.

In the light guide plate according to one or more embodiments of the present invention, when the light incident end portion includes a first point and a second point on each side thereof, and the second point is more away from the light incident surface than the first point, an angle formed by the side and the direction perpendicular to the light incident surface at the second point may be greater than or equal to an angle formed by the side and the direction perpendicular to the light incident surface at the first point as viewed in the direction perpendicular to the front surface or the back surface of the light guide plate member. In this case, each side of the light incident end portion may include a plurality of flat surfaces, or may include a curved surface.

When each side of the light incident end portion includes a first flat surface and a second flat surface and the second flat surface is more away from the light incident surface than the first flat surface, according to one or more embodiments of the present invention, the length of the first flat surface in the direction perpendicular to the light incident surface is greater than the length of the second flat surface in the direction perpendicular to the light incident surface.

In the light guide plate according to one or more embodiments of the present invention, each side of the light incident end portion may protrude laterally from one of the front surface and the back surface of the light guide plate member where the directivity changing unit is arranged toward the other one of the front surface and the back surface.

A surface light source device according to one or more embodiments of the present invention includes a light guide plate according one or more embodiments of the present invention, and a light source arranged to face an end face of the directivity changing unit.

The surface light source device according to one or more embodiments of the present invention may be usable in a liquid crystal device or a mobile device.

The embodiments described above may be modified or combined with one another to provide other embodiments. That is, embodiments of the present invention can be modified variously by combining these components.

The light guide plate or the surface light source device according to one or more embodiments of the present invention includes the directivity changing unit at the end of the light guide plate, and enables light from a light source, which is arranged to face the end face of the directivity changing unit, to efficiently enter the light guide plate. The light entering the light guide plate is directed toward the light emitting surface after it is reflected by the inner inclined surfaces and the outer inclined surfaces. This reduces the leak of light. As a result, the surface light source device can be thinner and have higher light use efficiency.

The light incident on the light incident surface and entering the light guide plate is reflected on the inner inclined surfaces and widened in the lateral direction of the light guide plate (the width direction of the light guide plate member) to reduce the amount of light traveling in front of the light source. This controls the brightness of light emission in front of the light source on the light emitting surface, and achieves uniform brightness distribution on the light emitting surface.

The light widened laterally by the inner inclined surfaces is reflected on the outer inclined surfaces and bent in a direction parallel to the light incident surface. This prevents light from leaking out of the light guide plate from the sides of the light guide plate member or from the lenticular lens, and prevents the light use efficiency from being lowered.

DETAILED DESCRIPTION

Embodiments of the present invention will now be described with reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. The present invention is not limited to the embodiments described below. The embodiments may be modified within the scope of the present invention.

First Embodiment

Figure 4:
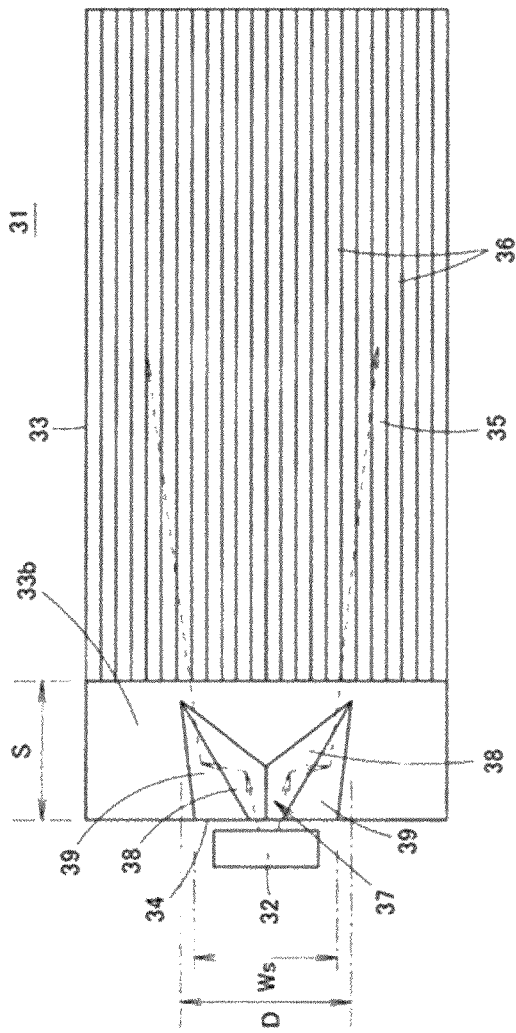
FIG. 4 is a plan view of the surface light source device shown in FIG. 3A.
Figure 3A:
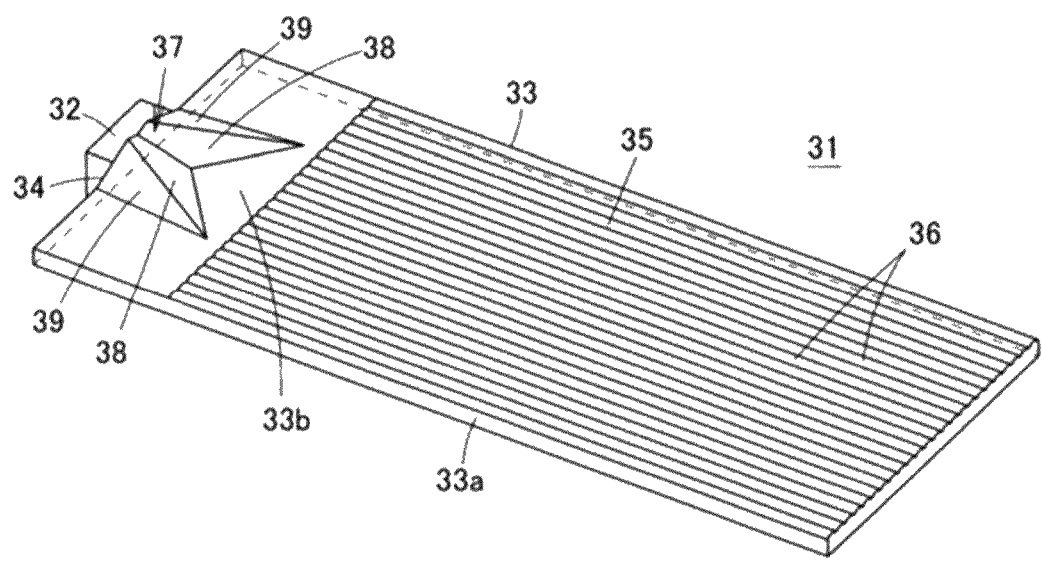
FIG. 3A is a perspective view of a surface light source device according to a first embodiment.
Figure 3B:
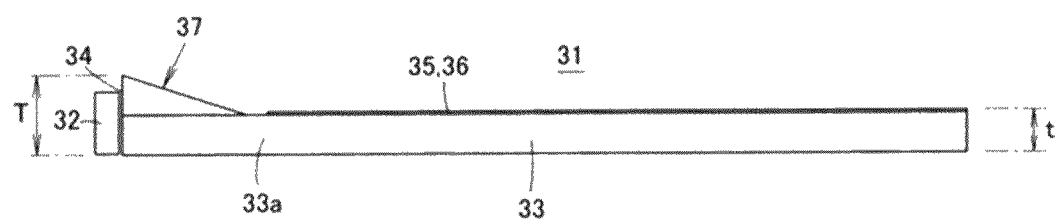
FIG. 3B is a side view of the surface light source device shown in FIG. 3A.
Figure 5:
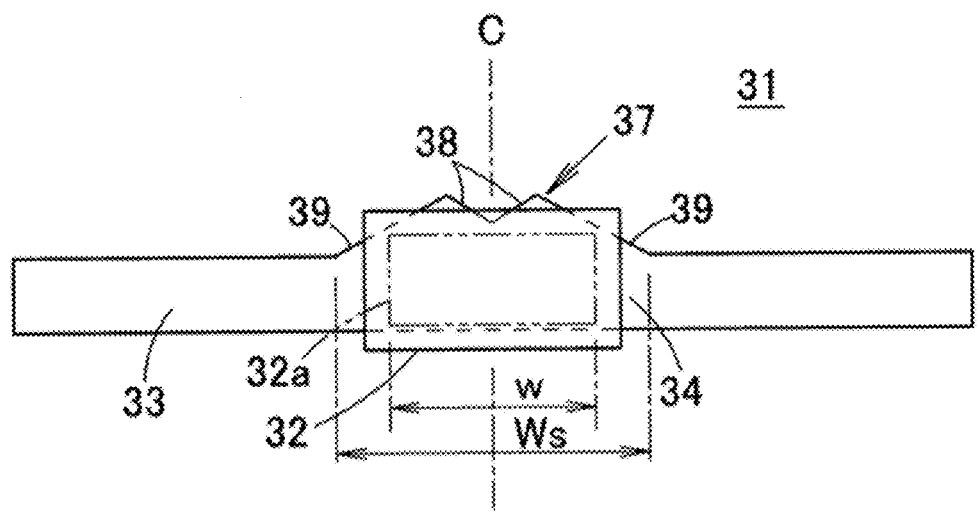
FIG. 5 is an end view of the surface light source device shown in FIG. 3A at its light source side.

The structure of a surface light source device according to a first embodiment of the present invention will now be described with reference to FIGS. 3A to 5. FIG. 3A is a perspective view of a surface light source device 31 according to the first embodiment. FIG. 3B is a side view of the surface light source device 31. FIG. 4 is a plan view of the surface light source device 31. FIG. 5 is an end view of the surface light source device 31 at its light source side.

The surface light source device 31 includes a light source 32 and a light guide plate 33. The light source 32, which incorporates one or a plurality of light emitting diodes (LEDs), emits white light through a front light emitting window 32a.

The light guide plate 33 is a molded piece of transparent resin having a high refractive index, such as acrylic resin, polycarbonate resin (PC), a cycloolefin material, and polymethyl methacrylate (PMMA). The light guide plate 33 has one end face serving as a light incident surface 34, and a portion of its top surface away from the light incident surface 34 serving as a light emitting surface 35 (emission surface). The light emitting surface 35 includes a lenticular lens 36, which is an array of lenses extending in the direction perpendicular to the light incident surface 34.

The light guide plate 33 includes a thin and flat light guide plate member 33a and a directivity changing unit 37. The directivity changing unit 37 is arranged on the top surface of a light incident end portion 33b of the light guide plate member 33a. The light incident end portion 33b is an area adjacent to the light incident surface 34 of the light guide plate member 33a, where no lenticular lens 36 is located in the illustrated example. Although not shown, the light guide plate 33 includes an optical pattern (not shown) on its lower surface for reflecting light guided in the light guide plate 33 and emitting the light from the top light emitting surface 35.

The directivity changing unit 37 is located at the midpoint of the top surface of the light incident end portion 33b in the width direction. The directivity changing unit 37 is a protruding part of the top surface of the light guide plate member 33a. The directivity changing unit 37 has an end face flush with the light incident surface 34. The top surface of the directivity changing unit 37 includes a pair of inner inclined surfaces 38 (a first inner inclined surface and a second inner inclined surface) and a pair of outer inclined surfaces 39 (a first outer inclined surface and a second outer inclined surface).

The two inner inclined surfaces 38 are symmetric to each other with respect to a central plane C of the light guide plate member 33a. The two inner inclined surfaces 38 define a V-shaped groove. The valley line between the inner inclined surfaces 38 defining the V-shaped groove is inclined upward from the light emitting surface toward the light incident surface. The inner inclined surfaces 38 are rectangular flat surfaces. The width of each inner inclined surface 38 increases gradually in the direction from the light incident end portion toward the light emitting surface and then decreases. Each inner inclined surface 38 is inclined downward from the light incident surface toward the light emitting surface in the lengthwise direction, and also is inclined downward from the side of the light guide plate member 33a toward the central plane in the width direction.

The two outer inclined surfaces 39 are located outward from the inner inclined surfaces 38, and are adjacent to the corresponding inner inclined surfaces 38. Each outer inclined surface 39 is a triangular flat surface, and is inclined downward from the central plane of the light guide plate member 33a toward the corresponding side of the light guide plate member 33a in the width direction.

The meeting line (edge) where the inner inclined surface 38 and the outer inclined surface 39 meet is inclined downward as it is away from the light incident surface 34. The distal end of each inner inclined surface 38 near the light emitting surface is aligned with the distal end of each outer inclined surface 39 near the light emitting surface. The distance D between the distal ends of the left and right inner inclined surfaces 38 (or the two outer inclined surfaces 39) near the light emitting surface is greater than the width Ws of the light incident end face of the directivity changing unit 37.

As shown in FIG. 5, the light source 32 faces the light incident surface 34 and the end face of the directivity changing unit 37. The light source 32 has the center (optical axis) along the valley line between the inner inclined surfaces 38 as viewed from above in the vertical direction. The light source 32 is arranged to have its light emitting window 32a residing within the light incident surface 34 and the end face of the directivity changing unit 37. The width w of the light emitting window 32a is equal to or smaller than the width Ws of the end face of the directivity changing unit 37 at the light incident surface. The valley line between the inner inclined surfaces 38 has one end located above the top surface of the light guide plate member 33a in the light incident surface 34. This allows the light source 32 to have the light emitting window 32a with a height greater than the thickness of the light guide plate member 33a. This structure allows light emitted from the light emitting window 32a of the light source 32 to efficiently enter the light guide plate 33. The light enters the left and right inclined surfaces 38 and 39 of the light guide plate 33 in an equal manner.

In this surface light source device 31, the light emitted from the light source 32 efficiently enters the light guide plate 33 from the thick portion of the light guide plate 33 that is thicker than the light guide plate member 33a (the directivity changing unit 37). The inner inclined surfaces 38 are inclined downward toward the light emitting surface 35, and thus the light entering the light guide plate 33 and reaching the inner inclined surfaces 38 is partially reflected downward on the inner inclined surfaces 38, and is then reflected on the lower surface of the light guide plate 33, and travels to an area including the light emitting surface 35. The inner inclined surfaces 38 function in the same manner as the inclined surfaces of the conventional example to prevent the light from leaking out of the light guide plate 33 when the light travels from the directivity changing unit 37 to the thin portion of the light guide plate 33.

The inner inclined surfaces 38 are also inclined in the width direction of the light guide plate 33. The light entering the inner inclined surfaces 38 is partially reflected on the inner inclined surfaces 38 in the lateral direction. This structure reduces the amount of light traveling in front of the light source 32, and thus prevents uneven illumination caused by the light emitting surface 35 illuminating brightly in front of the light source 32.

The light reflected on the inner inclined surfaces 38 in the lateral direction enters their adjacent outer inclined surfaces 39. The light entering the outer inclined surfaces 39 is reflected on the outer included surfaces 39 to bend into light more parallel to the direction perpendicular to the light incident surface 34 as shown in FIG. 4. The light then travels to the area including the light emitting surface 35. This structure prevents light from leaking from the sides of the light guide plate 33 and from the lenticular lens 36, and improves the light use efficiency.

The light guided toward the area including each inner inclined surface 38 is reflected on the optical pattern, and is emitted from the light emitting surface 35. The light emitted from the light emitting surface 35 undergoes widening of the directivity laterally with the lenticular lens 36. This allows uniform brightness distribution of the light.

Figure 2:
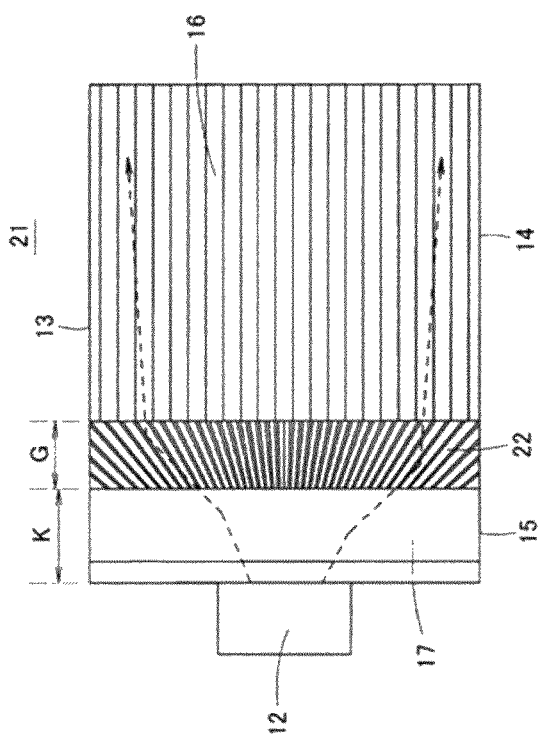
FIG. 2 is a plan view of another surface light source device known in the art.

The surface light source device 31 allows only the area of the light incident end portion 33b to constitute unused space in the device. This structure achieves smaller unused space of the light guide plate 33. For example, whereas the conventional device shown in FIG. 2 has unused space with a length of K+G=3.0 mm, the surface light source device of the first embodiment has unused space with a length (length of the light incident end portion 33b) S of 1.6 mm.

Figure 6:
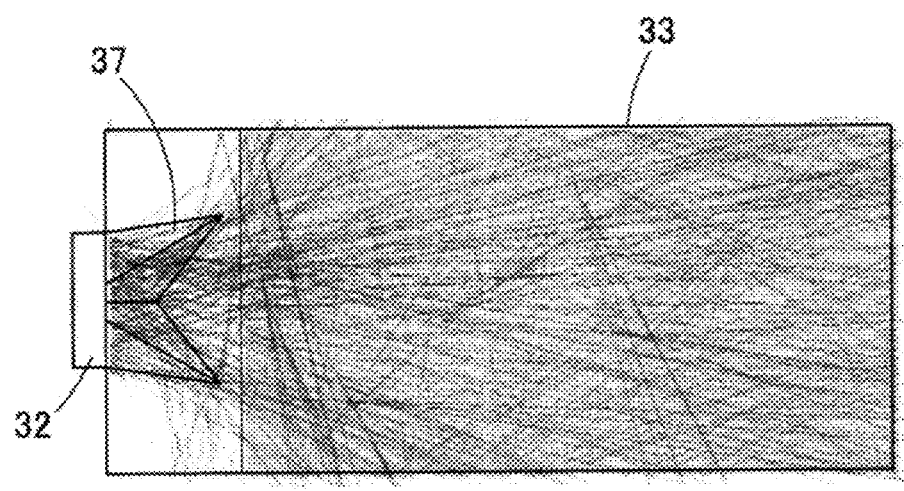
FIG. 6 is a diagram showing the behavior of light beams in the surface light source device shown in FIG. 3A.
Figure 7A:
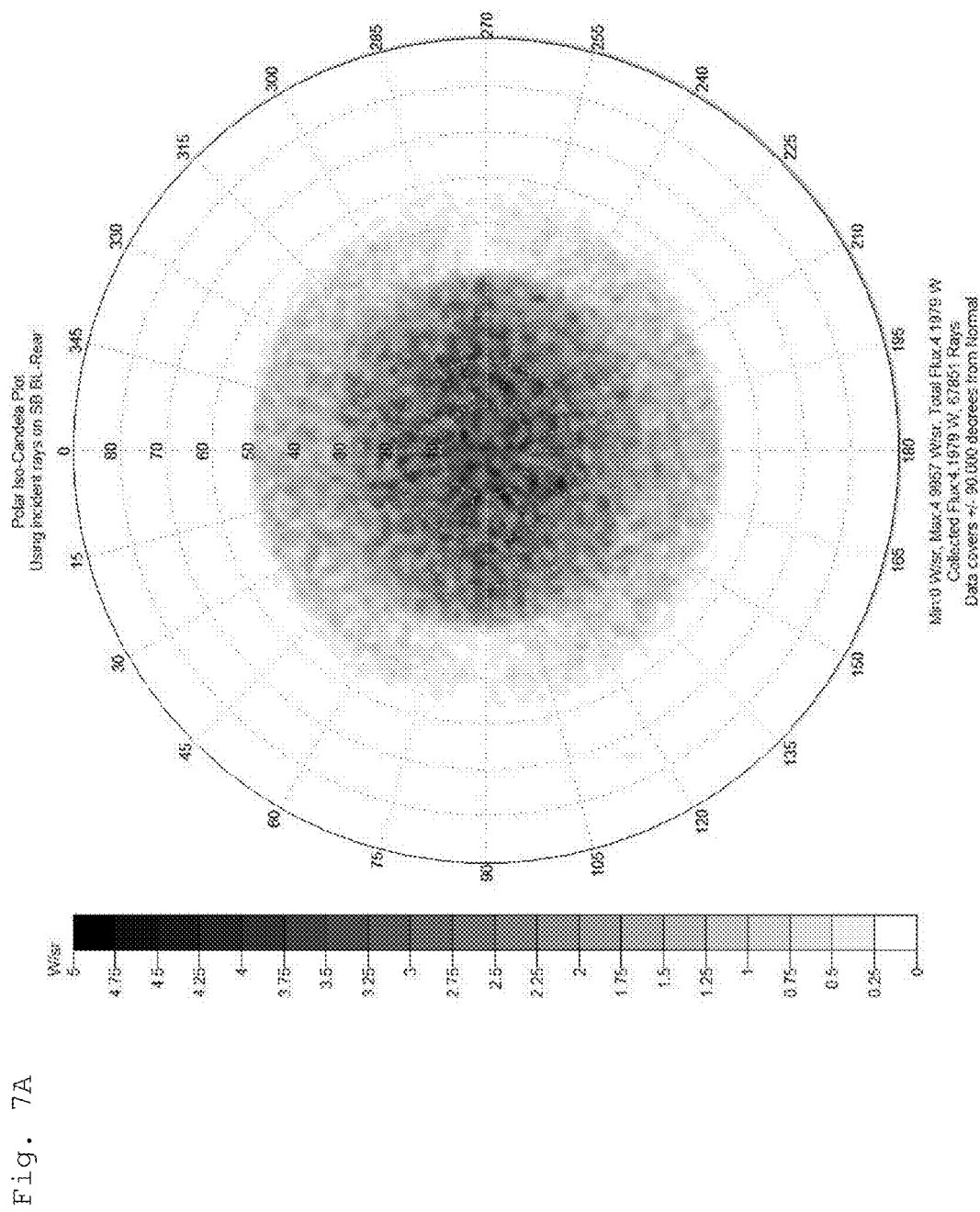
FIG. 7A is a diagram showing the directivity at the end face of the surface light source device shown in FIG. 3A.
Figure 7B:
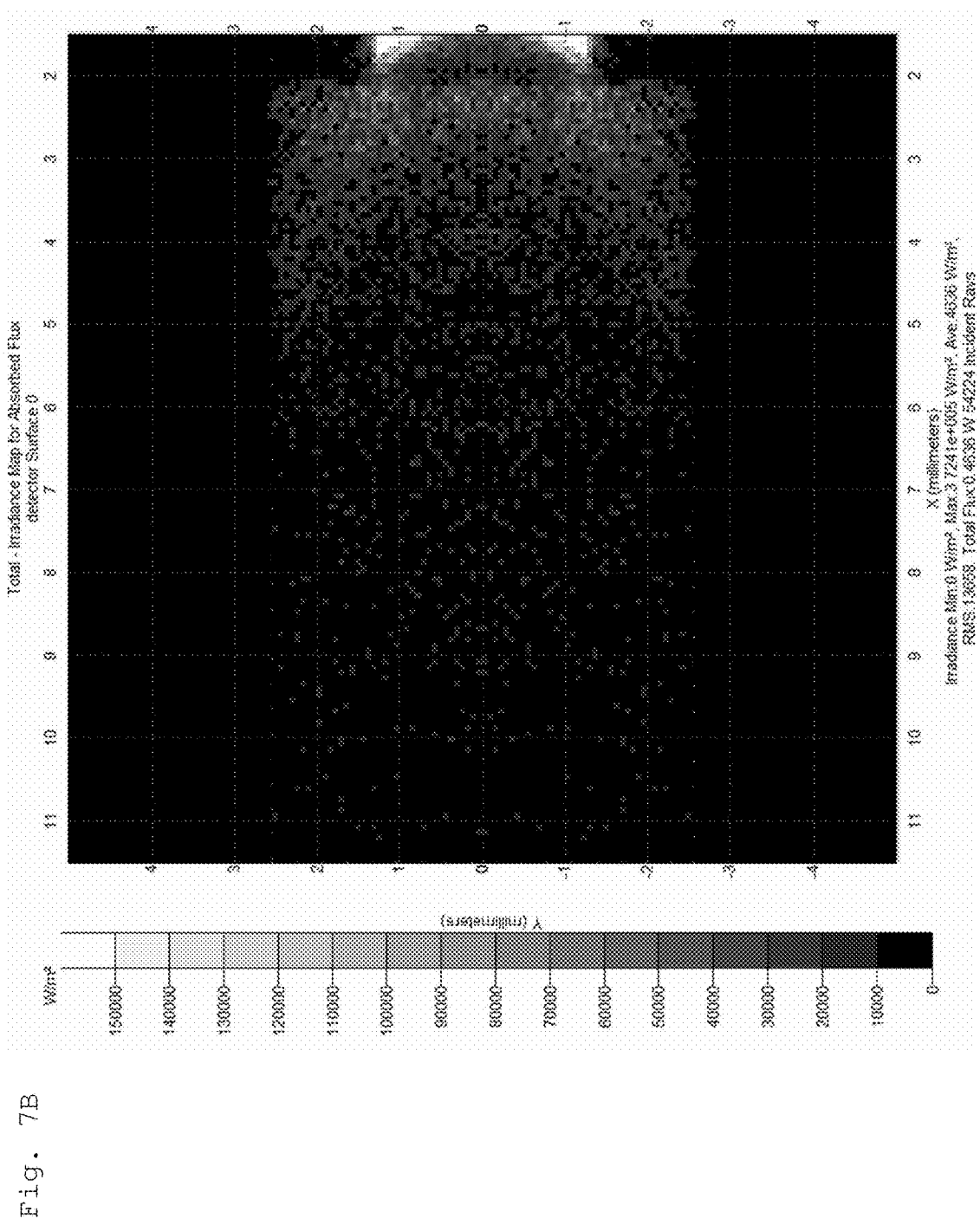
FIG. 7B is a diagram showing the brightness distribution at the light emitting surface of the surface light source device shown in FIG. 3A.

FIG. 6 shows the behavior of light in the surface light source device 31 according to the first embodiment. FIG. 7A shows the directivity of the light at an end face of the light guide plate 33 opposite to the light incident surface 34. The directivity shown in FIG. 7A is viewed in the direction perpendicular to the light incident surface 34, and is a substantially ideal circular directivity including almost no deflected light beams. FIG. 7B shows the measurement results for light leaking from the light emitting surface of a light guide plate including no optical pattern and no lenticular lens. The light guide plate including no optical pattern and no lenticular lens does not illuminate on the light emitting surface. For this light guide plate, an area illuminating white in FIG. 7B indicates a leak of light. In FIG. 7B, light leaks are unnoticeable on the emitting surface 35 or particularly in the peripheral portion of the light emitting surface 35.

Figure 1:
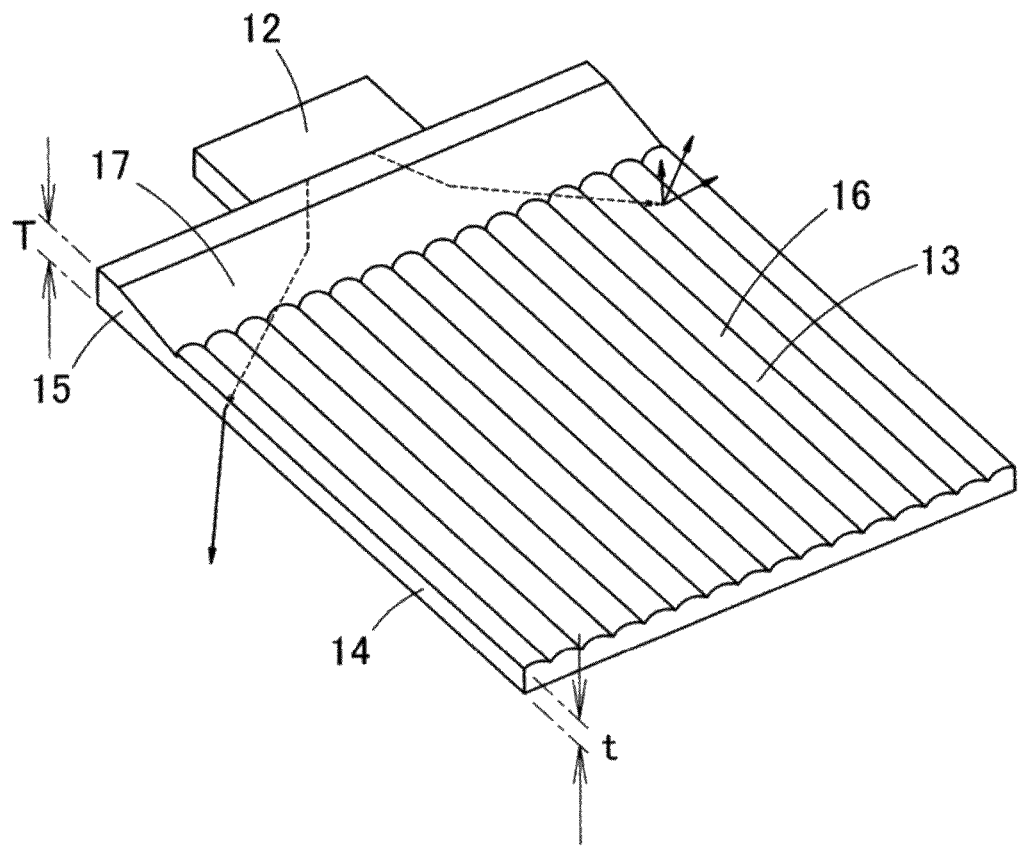
FIG. 1 is a perspective view of a surface light source device known in the art.
Figure 8:
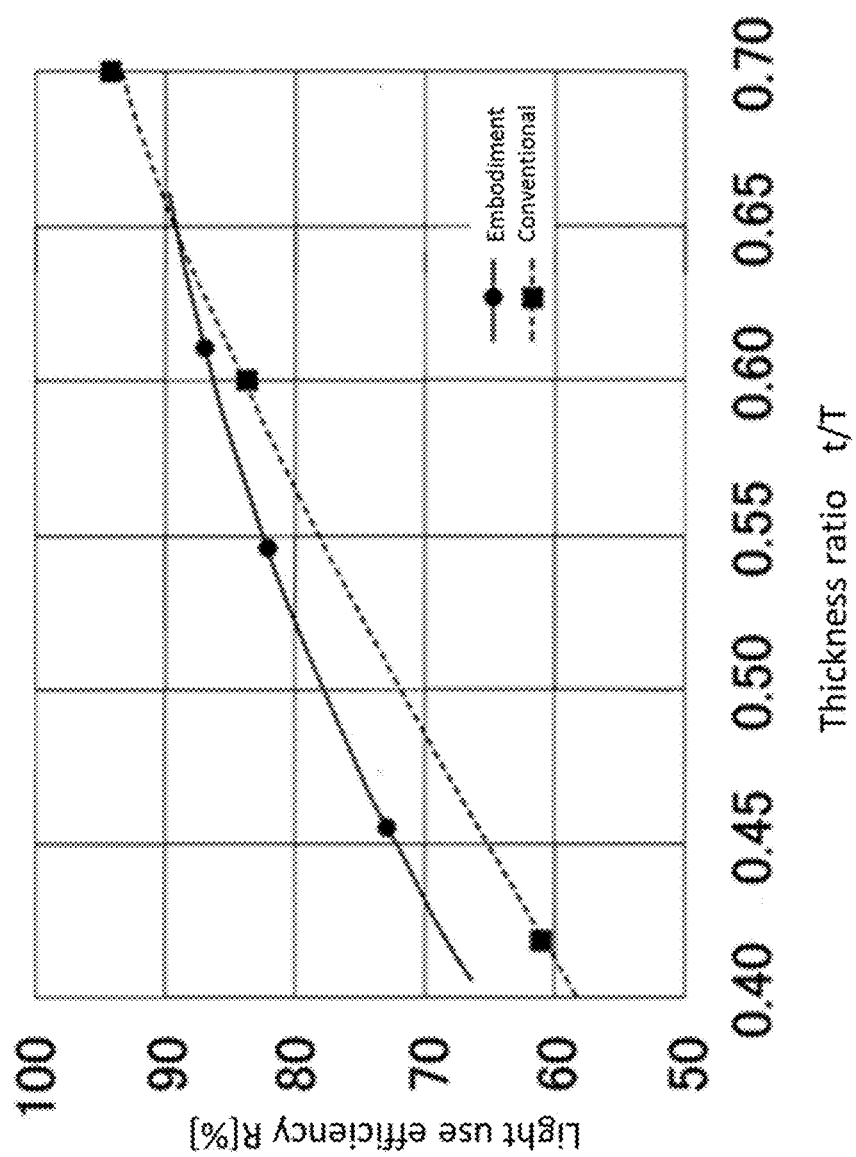
FIG. 8 is a graph showing the light use efficiency of the surface light source device shown in FIG. 3A in comparison with the light use efficiency of a conventional example.

FIG. 8 is a graph showing the light use efficiency of the surface light source device 31 according to the first embodiment in comparison with that of the conventional surface light source device 11 shown in FIG. 1. In FIG. 8, the horizontal axis represents the thickness ratio t/T, and the vertical axis represents the light use efficiency R. The thickness ratio is the ratio of the thickness t of a light emitting portion of the light guide plate to the maximum thickness T of the light guide plate at its light incidence side. For the conventional device, the thickness ratio t/T refers to the ratio of the height t of the light guide plate member 14 to the maximum height T of the light directing part 15. For the device of the first embodiment, the thickness ratio t/T refers to the ratio of the height t of the light emitting portion of the light guide plate 33 to the maximum height T of the light guide plate 33 in its portion including the directivity changing unit 37. The light use efficiency is the percentage (%) of light entering the light guide plate and emitted from the light emitting surface of the light guide plate. More specifically, the light guide plate having no optical pattern and no lenticular lens is used to guide light to enter the light incident end face, which is then emitted from the end face of the light guide plate opposite to the light incident surface. The amount of the emitted light is measured by using a light detector. The percentage of the light detected with the light detector with respect to the light entering the light incident end face is calculated. The resultant value serves as the light use efficiency.

As shown in FIG. 8, the surface light source device 31 according to the first embodiment has a higher light use efficiency R than the conventional surface light source device 11 in a range of a thickness ratio less than 0.65. In particular, the device of the first embodiment has the light use efficiency R higher than that of the conventional device by 2.3% or greater in the range of the thickness ratio of 0.60 or less and by 5% or greater in the range of the thickness ratio of 0.525 or less.

Modification of First Embodiment

Figure 9:
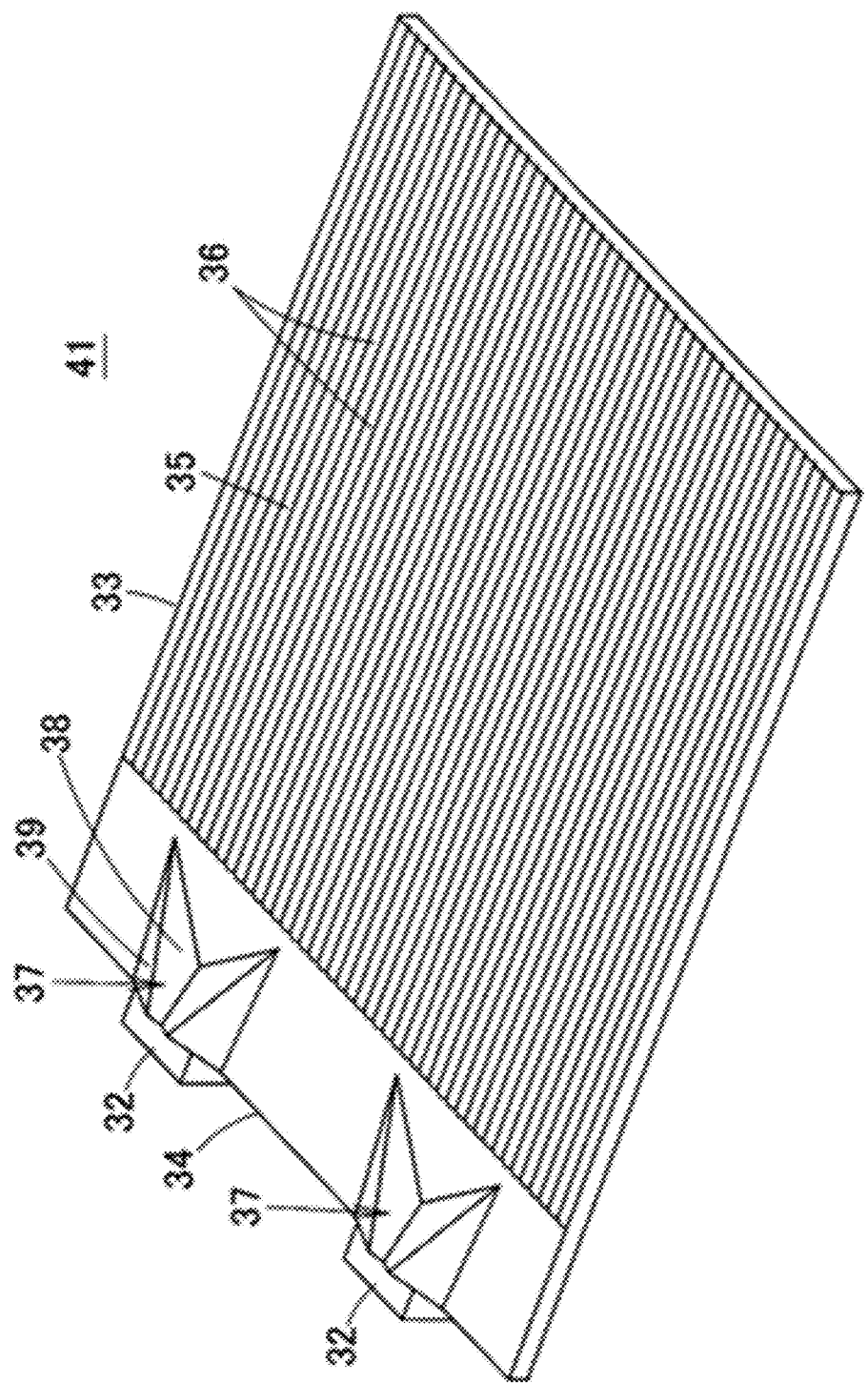
FIG. 9 is a perspective view of a surface light source device according to a modification of the first embodiment.

FIG. 9 is a perspective view of a modification of the first embodiment. A surface light source device 41 shown in FIG. 9 includes a plurality of light sources 32 arranged with a constant pitch along a light incident surface 34 of a light guide plate 33. The light guide plate 33 includes a plurality of directivity changing units 37 arranged on an end portion of its top surface. The directivity changing units 37 are arranged to face the corresponding light sources 32.

The surface light source device 41 allows the light guide plate 33 to have a larger area without lowering the brightness of light or without causing more uneven brightness. This structure allows fabrication of a backlight with a large light emitting area.

Figure 10A:
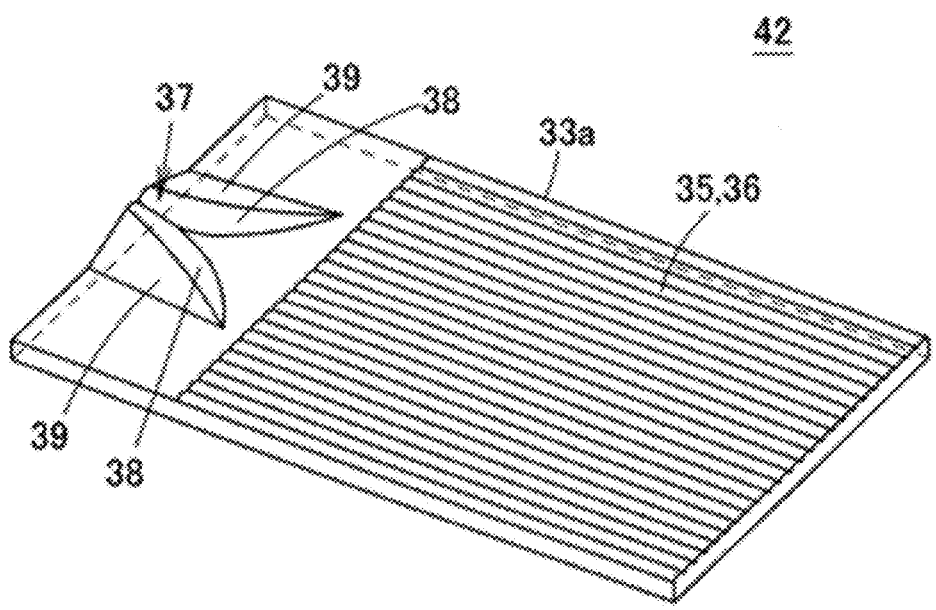
FIG. 10A is a perspective view of a surface light source device according to another modification of the first embodiment.
Figure 10B:
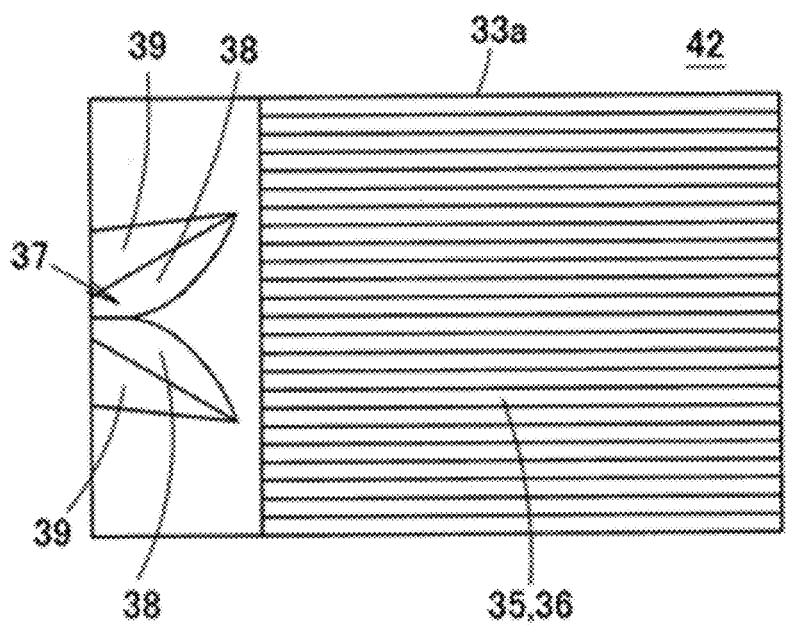
FIG. 10B is a plan view of the surface light source device according to the modification.

FIG. 10A is a perspective view of a light guide plate 42 according to another modification of the first embodiment. FIG. 10B is a plan view of the light guide plate 42. The light guide plate 42 includes a directivity changing unit 37 having convex surfaces serving as inner inclined surfaces 38.

Figure 11A:
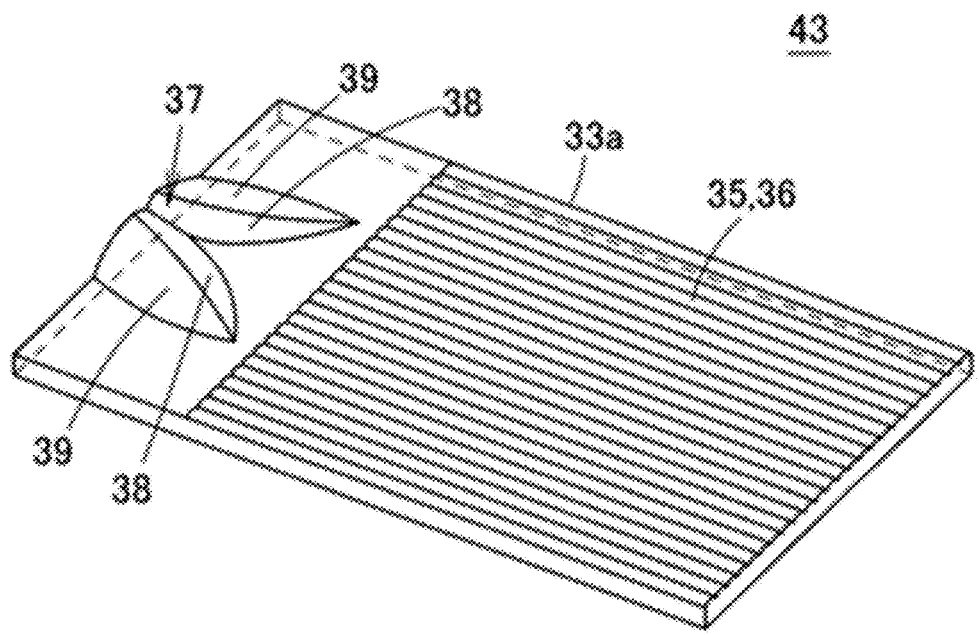
FIG. 11A is a perspective view of a surface light source device according to still another modification of the first embodiment.
Figure 11B:
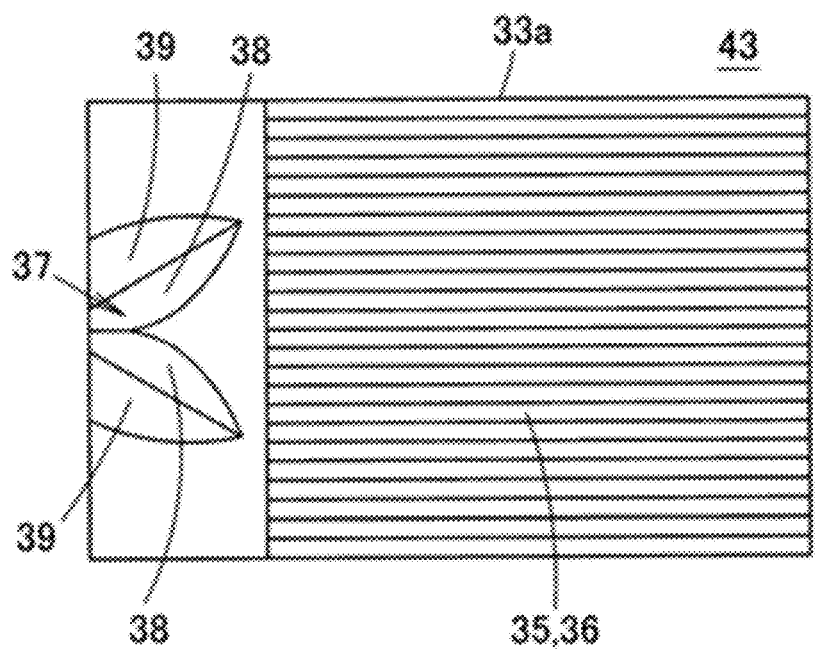
FIG. 11B is a plan view of the surface light source device according to the other modification.

As in a light guide plate 43 shown in FIGS. 11A and 11B, both the inner inclined surfaces 38 and the outer inclined surfaces 39 may be convex surfaces.

Second Embodiment

Figure 12A:
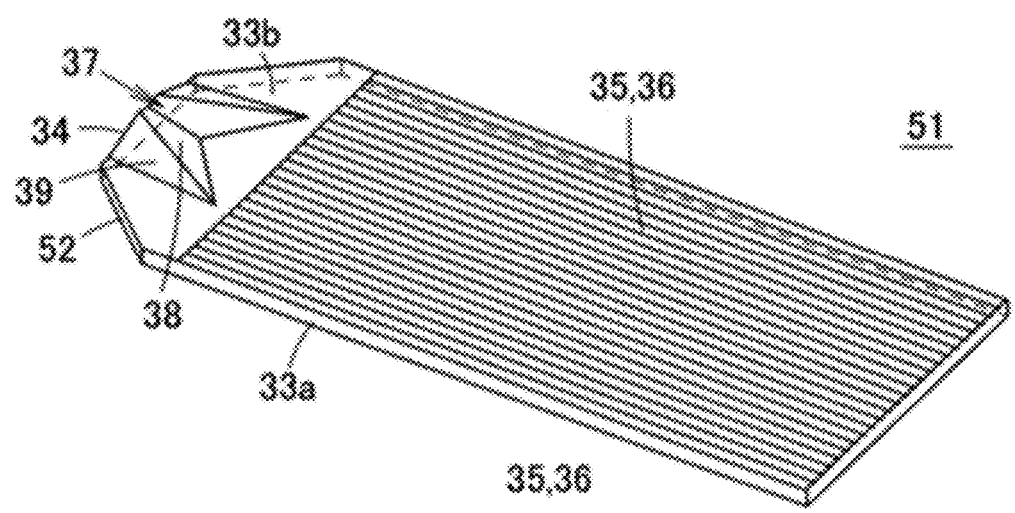
FIG. 12A is a perspective view of a light guide plate according to a second embodiment.
Figure 12B:
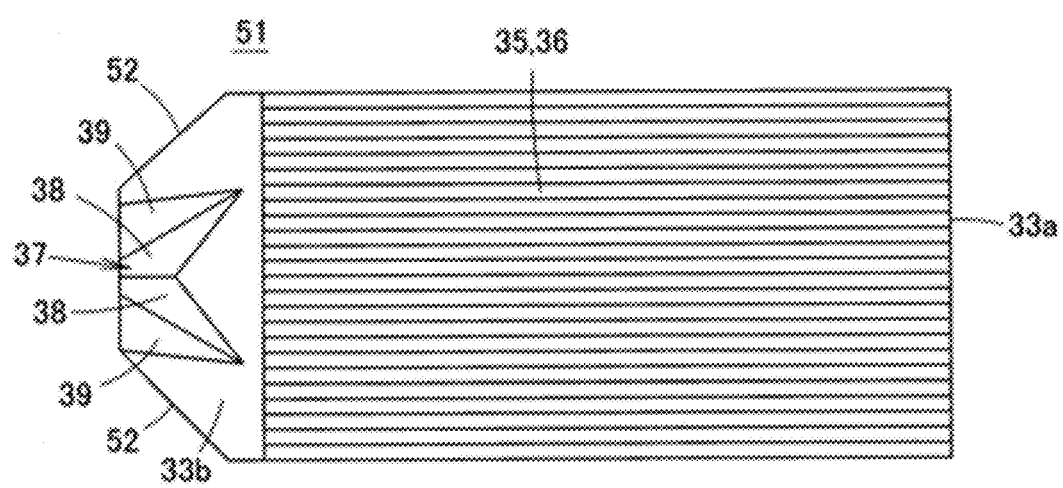
FIG. 12B is a plan view of the light guide plate shown in FIG. 12A.

FIG. 12A is a perspective view of a light guide plate 51 according to a second embodiment of the present invention. FIG. 12B is a plan view of the light guide plate 51. The light guide plate 51 according to the second embodiment includes a light incident end portion 33b having diagonally cut two sides, which serve as light reflecting walls 52. The other parts of the light guide plate 51 are the same as the corresponding parts of the light guide plate of the first embodiment. The parts of the light guide plate 51 that are the same as the parts in the first embodiment are given the same reference numerals and will not be described.

Figure 13:
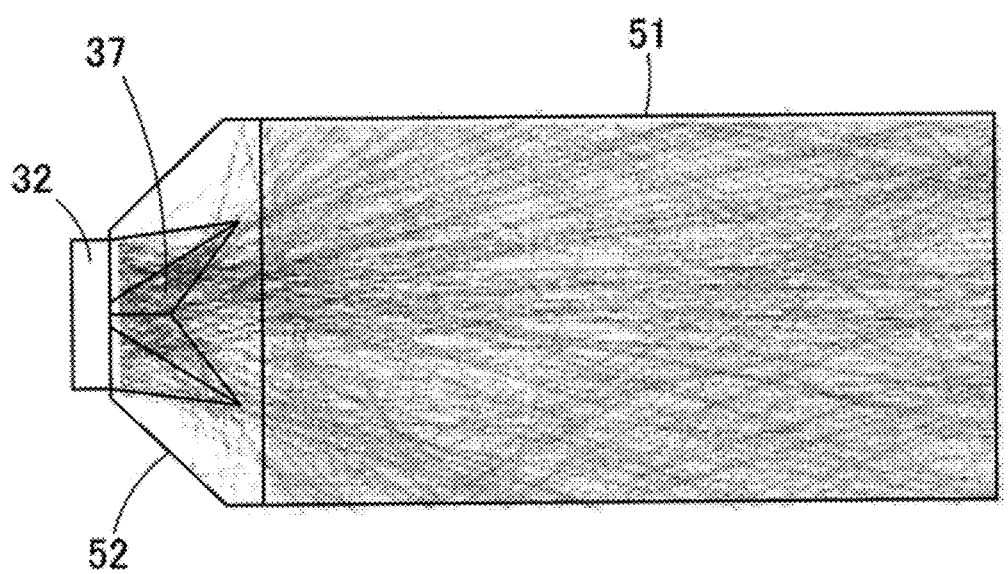
FIG. 13 is a diagram showing the behavior of light beams in the surface light source device shown in FIG. 12A.

In the light guide plate 51, light entering the directivity changing unit 37 is reflected in the lateral direction on the inner inclined surfaces 38, and travels to the sides of the light guide plate 51 after repeatedly reflected on the upper and lower surfaces of the light incident end portion 33b. The light reaching the sides of the light guide plate 51 is reflected on the light reflecting walls 52 and returns to the midpoint of the light guide plate 51. This structure reduces the leak of light from the sides of the light guide plate 51, and improves the light use efficiency. FIG. 13 shows the behavior of light in this light guide plate 51.

Modification of Second Embodiment

Figure 14A:
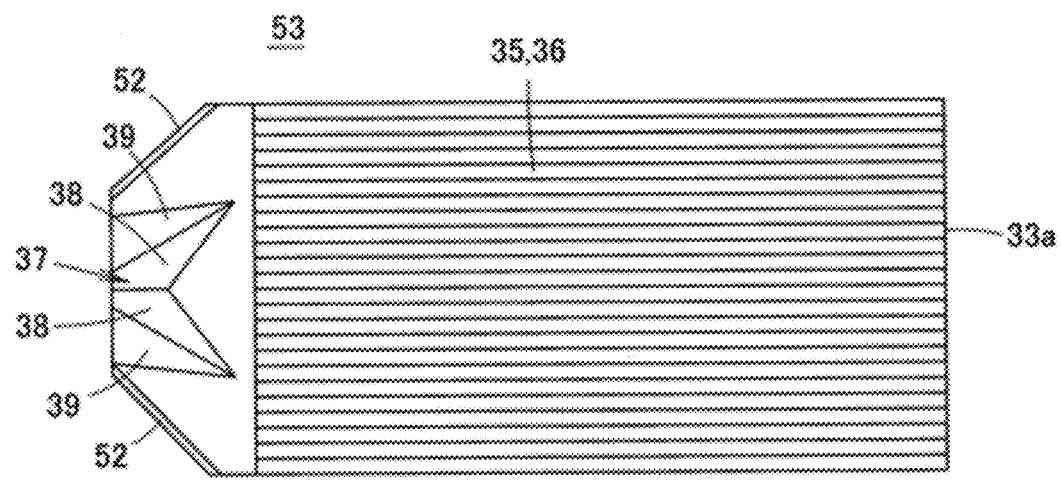
FIG. 14A is a plan view of a light guide plate according to a modification of the second embodiment.
Figure 14B:
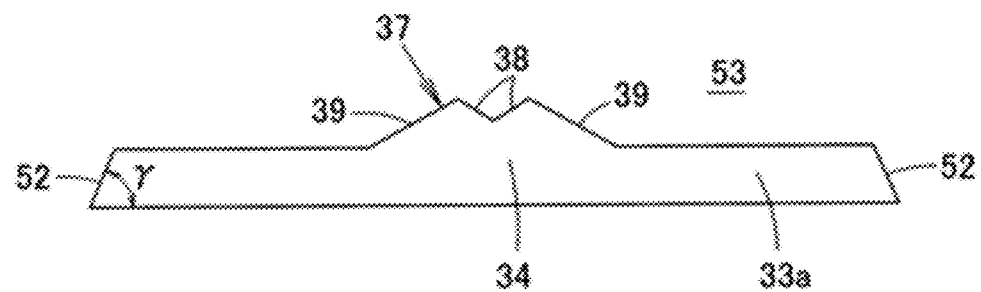
FIG. 14B is an end view of the light guide plate shown in FIG. 14A at its light incident surface.

FIG. 14A is a plan view of a light guide plate 53 according to a modification of the second embodiment. FIG. 14B is an end view of the light guide plate 53 at its light incident surface. The light guide plate 53 includes light reflecting walls 52 inclined in the direction perpendicular to the lower surface of the light guide plate 53. More specifically, the light reflecting walls 52 each form an angle γ with the lower surface of the light guide plate 53 as shown in FIG. 14B. For example, the angle γ (the angle of inclination) of each light reflecting wall 52 is smaller than 90 degrees. The angle γ may be in a range of 60 degrees or greater and 75 degrees or smaller.

The light guided through the light incident end portion 33b is reflected by the directivity changing unit 37 to undergo widening of the directivity in the plane perpendicular to the light emitting surface 35. The resultant light reflected by the directivity changing unit 37 enters the upper surface or the lower surface of the light guide plate 53 at a smaller incident angle. Although the light is not reflected on the optical pattern, the light can easily leak out of the light guide plate 33. In contrast to this structure, the inclined light reflecting walls 52 allow the light reflected on the light reflecting walls 52 to have a narrower directivity in the plane perpendicular to the light emitting surface 35. The resultant light reflected on the light reflecting walls 52 thus enters the upper surface of the light emitting surface 35 at a greater incident angle. This reduces the leak of light out of the light guide plate 33.

Figure 15A:
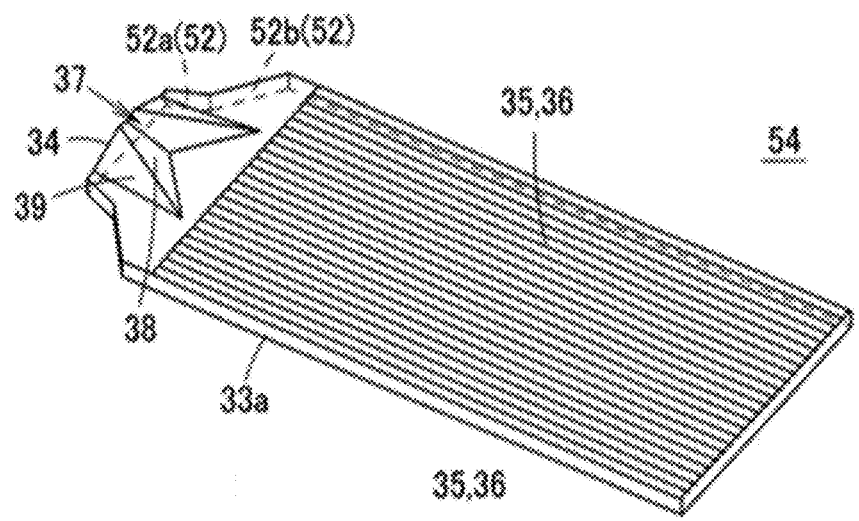
FIG. 15A is a perspective view of a light guide plate according to another modification of the second embodiment.
Figure 15B:
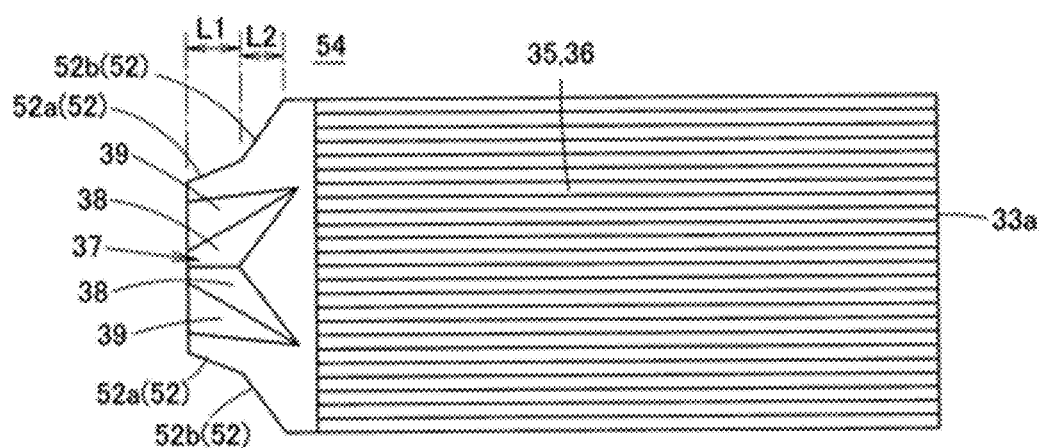
FIG. 15B is a plan view of the light guide plate shown in FIG. 15A.

FIG. 15A is a perspective view of a light guide plate 54 according to another modification of the second embodiment. FIG. 15B is a plan view of the light guide plate 54. The light guide plate 54 includes bent light reflecting walls 52 arranged at sides of its light incident end portion 33b. Each light reflecting wall 52 includes two flat surfaces, which are a light reflecting wall 52a located adjacent to the light incident surface 34 and a light reflecting wall 52b located away from the light incident surface 34. As viewed from above in the vertical direction, the angle of inclination formed by the light reflecting wall 52a and the direction parallel to the central plane C is smaller than the angle of inclination formed by the light reflecting wall 52b and the direction parallel to the central plane C. As viewed from above in the vertical direction, the length L1 of the light reflecting wall 52a in the direction perpendicular to the light incident surface 34 is greater than the length L2 of the light reflecting wall 52b in the direction perpendicular to the light incident surface 34. These bent light reflecting walls 52 can reflect the laterally widened light to return to the midpoint of the light guide plate.

Figure 16A:
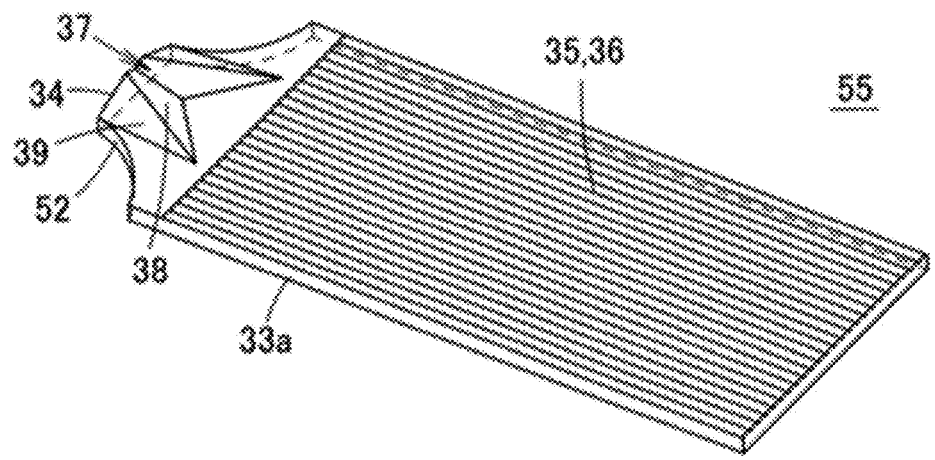
FIG. 16A is a perspective view of a light guide plate according to still another modification of the second embodiment.
Figure 16B:
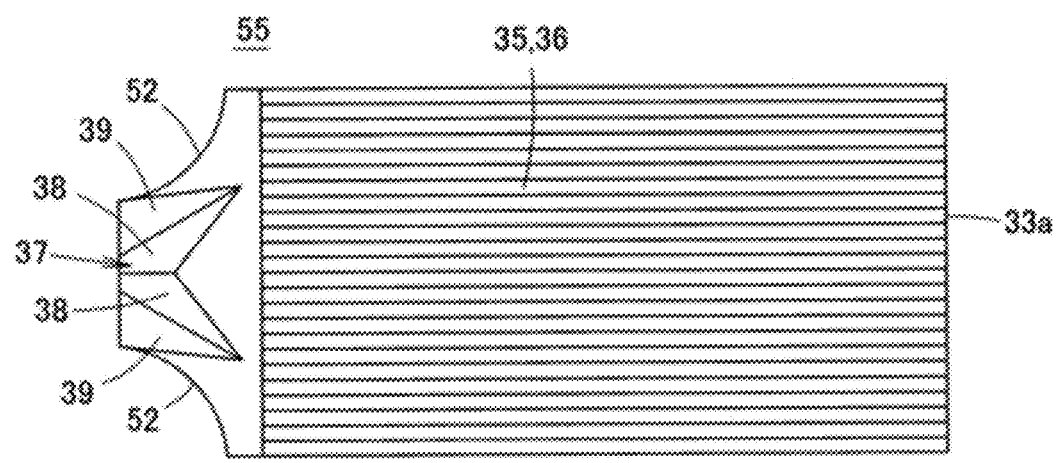
FIG. 16B is a plan view of the light guide plate shown in FIG. 16A.

As in a light guide plate 55 shown in FIGS. 16A and 16B, light reflecting walls 52 may be curved, or have arched surfaces as viewed from above in the vertical direction. Such arch light reflecting walls 52 can also reflect the laterally widened light to return to the midpoint of the light guide plate.

Third Embodiment

Figure 17A:
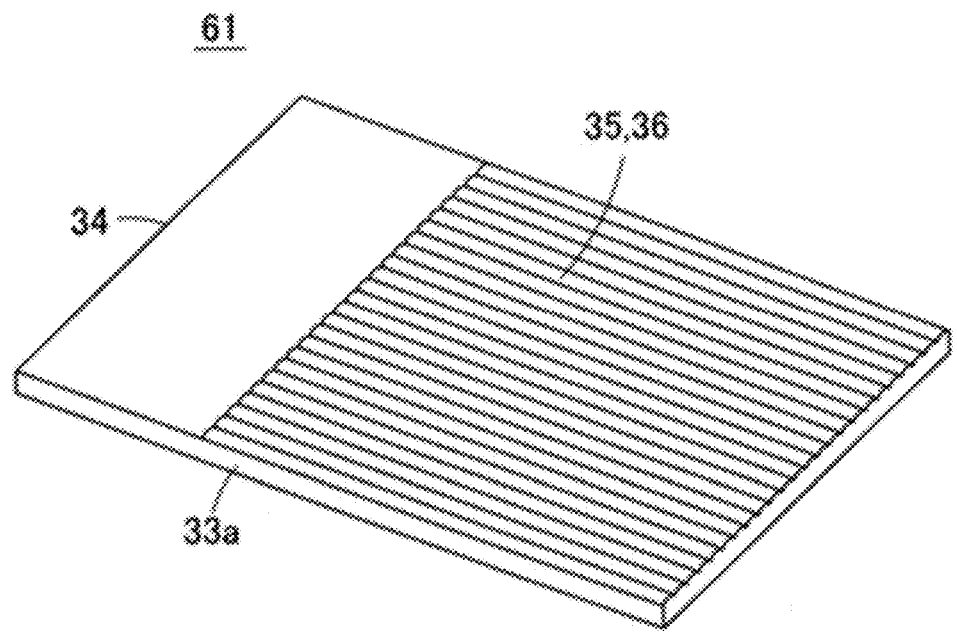
FIG. 17A is a perspective view of a light guide plate according to a third embodiment as viewed from the front surface.
Figure 17B:
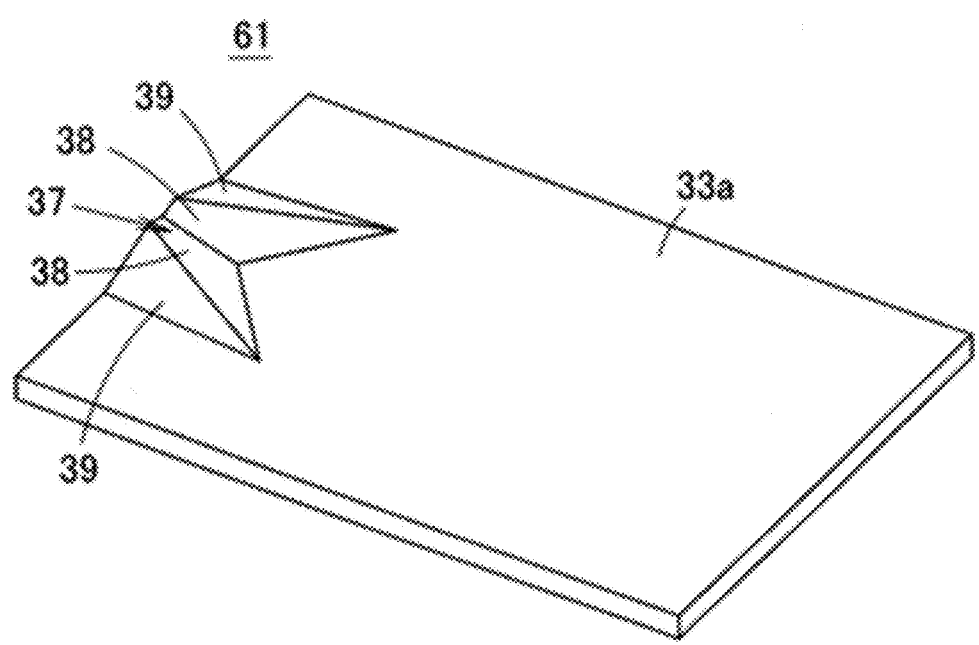
FIG. 17B is a perspective view of the light guide plate shown in FIG. 17A as viewed from the back surface.

FIG. 17A is a perspective view of a light guide plate 61 according to a third embodiment of the present invention as viewed from its top surface. FIG. 17B is a perspective view of the light guide plate 61 as viewed from its lower surface. The light guide plate 61 includes a directivity changing unit 37 on its lower surface and a lenticular lens 36 on its top surface.

Fourth Embodiment

Figure 18:
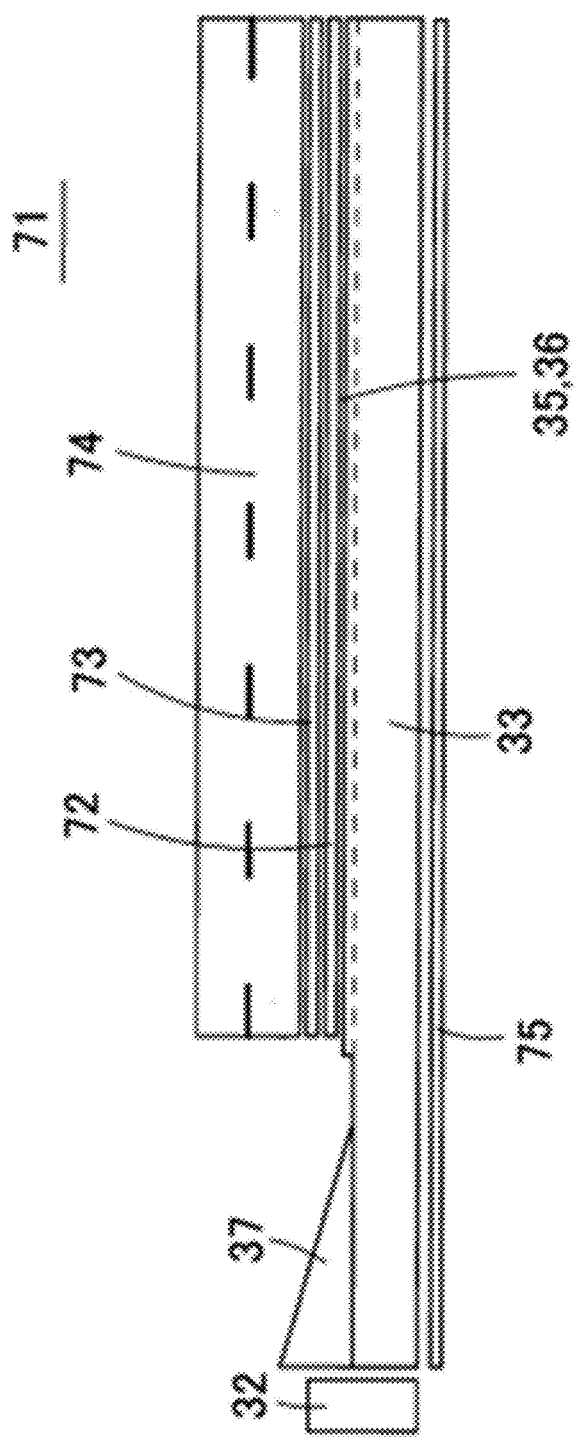
FIG. 18 is a schematic cross-sectional view of a liquid crystal display according to one or more embodiments of the present invention.

FIG. 18 is a schematic cross-sectional view of a liquid crystal display 71 including a surface light source device according to one or more embodiments of the present invention (e.g., the surface light source device 31 of the first embodiment). As shown in FIG. 18, the liquid crystal display 71 includes a diffusion plate 72, one or two prism sheets 73, and a liquid crystal panel 74 arranged in this order on the light emitting surface 48 of the light guide plate 43. The liquid crystal display also includes a reflection sheet 75 on the back surface of the light guide plate 43. The surface light source device according to one or more embodiments of the present invention enables the liquid crystal display 71 to have a high light use efficiency and improve the visibility of the screen, and allows the liquid crystal display 71 to be thinner.

Fifth Embodiment

Figure 19:
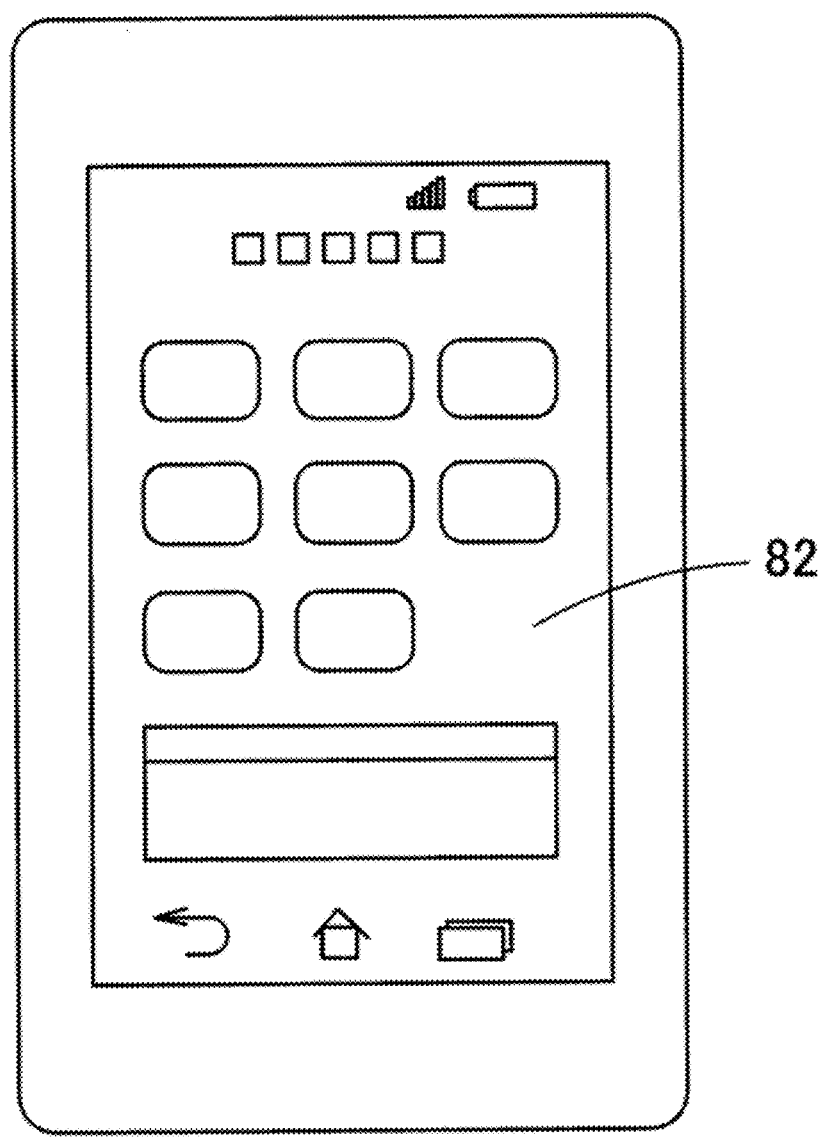
FIG. 19 is a schematic plan view of a mobile device according to one or more embodiments of the present invention.

FIG. 19 is a front view of a mobile device including a liquid crystal display according to one or more embodiments of the present invention. The mobile device is a smartphone 81. The smartphone 81 includes a liquid crystal display 82 with a front touch panel. The liquid crystal display according to one or more embodiments of the present invention allows the smartphone 81 to have a higher light use efficiency and enables bright display on the screen. The surface light source device according to one or more embodiments of the present invention is usable in other mobile devices, such as tablet computers, electronic dictionaries, and electronic book readers, in addition to mobile phones such as smartphones.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 31, 41 surface light source device
32 light source
33, 42, 43, 51, 53, 54, 55, 61 light guide plate
33a light guide plate member
33b light incident end portion
34 light incident surface
35 light emitting surface
36 lenticular lens
37 directivity changing unit
38 inner inclined surface
39 outer inclined surface
52 light reflecting wall
71 liquid crystal display
81 smartphone

The invention claimed is:

1. A light guide plate, comprising:
a light guide plate member comprising:
a light incident surface on an end face of the light guide member, and
a light emitting surface on a front surface of the light guide plate member,
wherein the light incident surface is structured to have light incident thereon, and
wherein the light emitting surface is structured to widen and emit light incident thereon out of the light guide plate member; and
a directivity changing unit arranged on a light incident end portion of the light guide plate member on the front surface or a back surface of the light guide plate member,
wherein the directivity changing unit comprises a first inner inclined surface and a second inner inclined surface that change a directivity of the incident light within the directivity changing unit to widen the light laterally with respect to a direction perpendicular to the light incident surface,
wherein the directivity changing unit comprises a first outer inclined surface that has a first meeting line with the first inner inclined surface and a second outer inclined surface that has a second meeting line with the second inner inclined surface,
wherein the first outer inclined surface changes the directivity of the light widened laterally by the first inner inclined surface to a directivity of light forming a smaller angle with respect to the direction perpendicular to the light incident surface,
wherein the second outer inclined surface changes the directivity of the light widened laterally by the second inner inclined surface to a directivity of light forming a smaller angle with respect to the direction perpendicular to the light incident surface,
wherein a distance between the first meeting line and the second meeting line becomes greater at positions farther away from the light emitting surface as viewed in a direction perpendicular to the front surface or the back surface of the light guide plate member,
wherein the first inner inclined surface and the second inner inclined surface are inclined to be nearer the front surface or the back surface of the light guide plate member at positions nearer to a midpoint between the first inner inclined surface and the second inner inclined surface in a plane including the light incident surface,
wherein the first outer inclined surface and the second outer inclined surface are inclined to be nearer to the front surface or the back surface of the light guide plate member at positions farther away from a midpoint between the first inner inclined surface and the second inner inclined surface in a plane including the light incident surface, and
wherein a meeting line between the first inner inclined surface and the second inner inclined surface is inclined to be farther away from the front surface or the back surface of the light guide plate member at positions nearer to the light incident surface.

2. The light guide plate according to claim 1, wherein the first and second inner inclined surfaces and the first and second outer inclined surfaces are flat surfaces or curved surfaces.

3. The light guide plate according to claim 1, wherein the light emitting surface comprises a lenticular lens pattern.

4. The light guide plate according to claim 1,
wherein the light incident end portion of the light guide plate member has both sides inclined with respect to the direction perpendicular to the light incident surface as viewed in the direction perpendicular to the front surface or the back surface of the light guide plate member, and
wherein the width of the light incident end portion of the light guide plate member is greater at positions farther away from the light incident surface.

5. The light guide plate according to claim 4,
wherein the light incident end portion includes a first point and a second point on each side thereof, and the second point is farther away from the light incident surface than the first point, and
wherein an angle formed by the side and the direction perpendicular to the light incident surface at the second point is greater than or equal to an angle formed by the side and the direction perpendicular to the light incident surface at the first point as viewed in the direction perpendicular to the front surface or the back surface of the light guide plate member.

6. The light guide plate according to claim 5,
wherein each side of the light incident end portion comprises a plurality of flat surfaces.

7. The light guide plate according to claim 6,
wherein each side of the light incident end portion comprises a first flat surface and a second flat surface, and the second flat surface is farther away from the light incident surface than the first flat surface, and wherein the length of the first flat surface in the direction perpendicular to the light incident surface is greater than the length of the second flat surface in the direction perpendicular to the light incident surface.

8. The light guide plate according to claim 5, wherein each side of the light incident end portion comprises a curved surface.

9. The light guide plate according to claim 4, wherein each side of the light incident end portion protrudes laterally from one of the front surface and the back surface of the light guide plate member where the directivity changing unit is arranged toward the other one of the front surface and the back surface.

10. A surface light source device, comprising:
the light guide plate according claim 1; and
a light source arranged to face an end face of the directivity changing unit.

11. A liquid crystal display, comprising:
the surface light source device according to claim 10, and
a liquid crystal panel.

12. A mobile device comprising the liquid crystal display according to claim 11.

* * * * *